US011244055B1

(12) United States Patent
Lambert et al.

(10) Patent No.: US 11,244,055 B1
(45) Date of Patent: Feb. 8, 2022

(54) MANAGEMENT CONTROLLER TO BIOS ROOT OF TRUST BYPASS IMPLANT DETECTION AND REMEDIATION

(71) Applicant: Dell Products L.P., Round Rock, TX (US)

(72) Inventors: Timothy M. Lambert, Austin, TX (US); Mukund P. Khatri, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/157,492

(22) Filed: Jan. 25, 2021

(51) Int. Cl.
  *G06F 9/44* (2018.01)
  *G06F 21/57* (2013.01)
  *G06F 1/26* (2006.01)
  *G06F 1/24* (2006.01)
  *G06F 9/4401* (2018.01)

(52) U.S. Cl.
  CPC .............. *G06F 21/575* (2013.01); *G06F 1/24* (2013.01); *G06F 1/26* (2013.01); *G06F 9/442* (2013.01); *G06F 2221/034* (2013.01)

(58) Field of Classification Search
  CPC . G06F 21/575; G06F 1/24; G06F 1/26; G06F 9/442; G06F 2221/034
  See application file for complete search history.

(56) References Cited

U.S. PATENT DOCUMENTS

| 6,058,475 A * | 5/2000 | McDonald | G06F 11/1417 713/2 |
| 6,496,881 B1 * | 12/2002 | Green | G06F 1/24 710/58 |
| 8,438,423 B1 * | 5/2013 | Barkelew | G06F 11/1417 714/36 |
| 2012/0066546 A1 * | 3/2012 | Kim | G06F 11/1417 714/15 |
| 2012/0137114 A1 * | 5/2012 | Tsai | G06F 11/1417 713/2 |
| 2013/0227356 A1 * | 8/2013 | Kim | G06F 9/4401 714/48 |
| 2014/0129820 A1 * | 5/2014 | Lim | G06F 8/654 713/2 |
| 2016/0253471 A1 * | 9/2016 | Volpe | G06F 8/65 607/5 |
| 2018/0088962 A1 * | 3/2018 | Balakrishnan | G06F 11/1417 |

* cited by examiner

Primary Examiner — Zahid Choudhury
(74) Attorney, Agent, or Firm — Jackson Walker L.L.P.

(57) ABSTRACT

An information handling system may include a host system comprising a host system processor, a management controller communicatively coupled to the host system processor and a logic device and configured to perform out-of-band management of the information handling system, and a logic device communicatively coupled to the host system and the management controller. The logic device may be configured to, upon determining that a watchdog timer has timed out a threshold number of times without completion of a boot of the management controller, allow boot of the host system, after boot of the host system, determine if a later boot of the management controller occurs, and if the later boot of the management controller occurs, force the host system to power off.

9 Claims, 2 Drawing Sheets

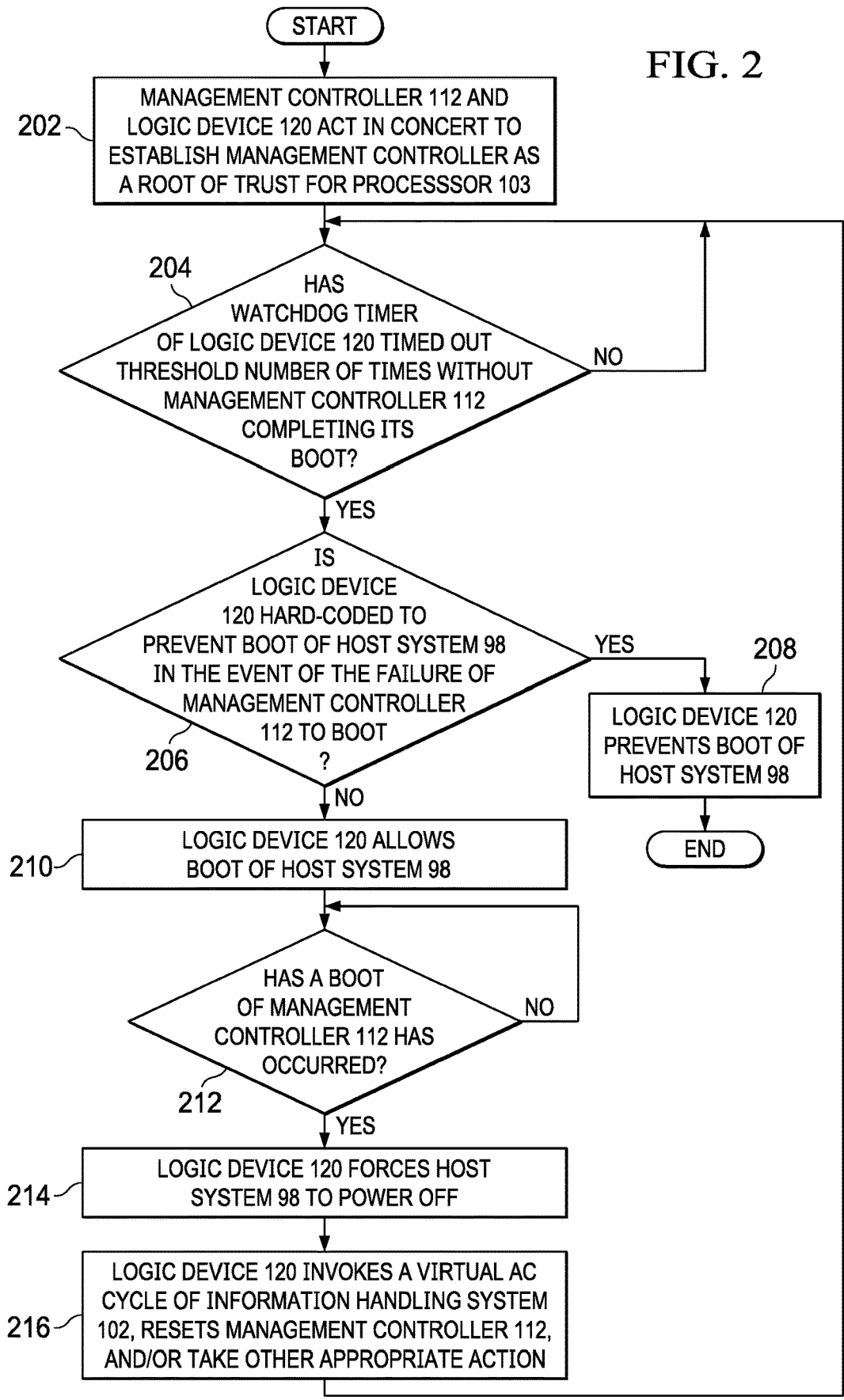

US 11,244,055 B1

MANAGEMENT CONTROLLER TO BIOS ROOT OF TRUST BYPASS IMPLANT DETECTION AND REMEDIATION

TECHNICAL FIELD

The present disclosure relates in general to information handling systems, and more particularly to methods and systems for detection of a root of trust bypass implant and remediation upon such detection.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In accordance with the teachings of the present disclosure, the disadvantages and problems associated with existing approaches to detection of a root of trust bypass implant and remediation upon such detection in an information handling system may be reduced or eliminated.

In accordance with embodiments of the present disclosure, an information handling system may include a host system comprising a host system processor, a management controller communicatively coupled to the host system processor and a logic device and configured to perform out-of-band management of the information handling system, and a logic device communicatively coupled to the host system and the management controller. The logic device may be configured to, upon determining that a watchdog timer has timed out a threshold number of times without completion of a boot of the management controller, allow boot of the host system, after boot of the host system, determine if a later boot of the management controller occurs, and if the later boot of the management controller occurs, force the host system to power off.

In accordance with these and other embodiments of the present disclosure, a method may be provided, in an information handling system comprising a host system comprising a host system processor and a management controller communicatively coupled to the host system processor and a logic device and configured to perform out-of-band management of the information handling system. The method may include, upon determining that a watchdog timer has timed out a threshold number of times without completion of a boot of the management controller, allowing boot of the host system. The method may also include determining if a later boot of the management controller occurs after boot of the host system. The method may further include forcing the host system to power off if the later boot of the management controller occurs.

In accordance with these and other embodiments of the present disclosure, an article of manufacture may include a non-transitory computer-readable medium and computer-executable instructions carried on the computer-readable medium, the instructions readable by a processing device, the instructions, when read and executed, for causing the processing device to, in an information handling system comprising a host system comprising a host system processor and a management controller communicatively coupled to the host system processor and a logic device and configured to perform out-of-band management of the information handling system: upon determining that a watchdog timer has timed out a threshold number of times without completion of a boot of the management controller, allow boot of the host system; after boot of the host system, determine if a later boot of the management controller occurs; and if the later boot of the management controller occurs, force the host system to power off.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 2 illustrates a flow chart of an example method for detection of an implant for bypassing management controller to BIOS root of trust and remediation thereof, in accordance with embodiments of the present disclosure.

DETAILED DESCRIPTION

Figure 1:
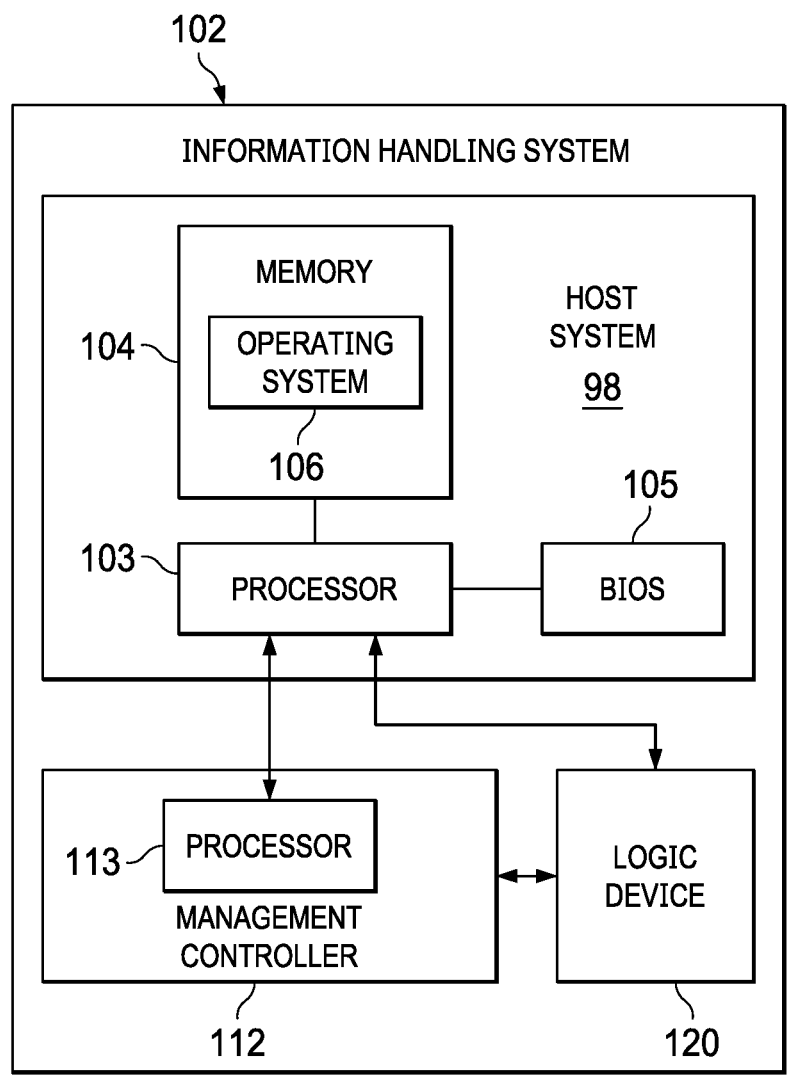
FIG. 1 illustrates a block diagram of an example information handling system, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems, buses, memories, I/O devices and/or interfaces, storage resources, network interfaces, motherboards, and/or any other components and/or elements of an information handling system.

U.S. patent application Ser. No. 17/011,583 filed on Sep. 3, 2020 (the '583 Application), and incorporated herein by reference in its entirety, discloses an information handling system that may include a management controller (e.g., a baseboard management controller) that boots in response to an alternating current (AC) power cycle event, provides a management controller ready signal in response to the boot, establishes the management controller as a root of trust for the processor in response to providing the management controller ready signal, and provides a processor boot indication in response to establishing the management controller as the root of trust. Furthermore, in the '583 Application, a processor may boot to an operating system in response to the processor boot indication instead of in response to the AC power cycle. Also in the '583 Application, a logic device may determine that the management controller failed to provide the management controller ready signal, determine that the management controller failed to boot in response to the AC power cycle and determine that the boot management controller (BMC) failed to provide the management controller ready signal, and provide a power-on reset signal to the management controller in response to determining that the BMC failed to boot. The '583 Application also contemplates a setting in the logic device to provide for a "no brick" boot of the operating system when the management controller has repeatedly failed to successfully boot through multiple successive timeouts of a watchdog timer of the logic device (e.g., three or more times in succession).

A potential disadvantage of the '583 Application is that a malicious actor could implant a bypass mechanism (e.g., in the form of a small, highly undetectable microchip) to delay reset of the management controller, which may in turn delay boot of the management controller such that the management controller fails to boot after multiple successive timeouts of the watchdog timer of the logic device. If the logic device is configured to do so, the failure of the management controller to boot after multiple successive timeouts of the watchdog timer of the logic device may cause the operating system of the information handling system to boot without the management controller providing hardware root of trust to executable code of a basic input/output system (BIOS), and as such, unverified BIOS and operating system code may execute, potentially allowing a malicious actor to perpetrate an attack through BIOS or the operating system code.

FIG. 1 illustrates a block diagram of an example information handling system 102, in accordance with embodiments of the present disclosure. In some embodiments, information handling system 102 may comprise a personal computer. In some embodiments, information handling system 102 may comprise or be an integral part of a server. In other embodiments, information handling system 102 may comprise a portable information handling system (e.g., a laptop, notebook, tablet, handheld, smart phone, personal digital assistant, etc.). As depicted in FIG. 1, information handling system 102 may include a processor 103, a memory 104 communicatively coupled to processor 103, a basic input/output system (BIOS) 105 communicatively coupled to processor 103, a management controller 112 communicatively coupled to processor 103, and a logic device 120 communicatively coupled to processor 103 and, management controller 112. In operation, processor 103, memory 104, and BIOS 105 may comprise at least a portion of a host system 98 of information handling system 102.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions, or aggregation of programs of executable instructions, configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface. Active portions of operating system 106 may be transferred to memory 104 for execution by processor 103. Although operating system 106 is shown in FIG. 1 as stored in memory 104, in some embodiments, operating system 106 may be stored in storage media accessible to processor 103, and active portions of operating system 106 may be transferred from such storage media to memory 104 for execution by processor 103.

BIOS 105 may be communicatively coupled to processor 103 and may include any system, device, or apparatus configured to identify, test, and/or initialize information handling resources of information handling system 102. "BIOS" may broadly refer to any system, device, or apparatus configured to perform such functionality, including without limitation, a Unified Extensible Firmware Interface (UEFI). In some embodiments, BIOS 105 may be implemented as a program of instructions that may be stored on a read-only memory of information handling system 102 and which may be read by and executed on processor 103 to carry out the functionality of BIOS 105. In these and other embodiments, BIOS 105 may comprise boot firmware configured to be the first code executed by processor 103 when information handling system 102 is booted and/or powered on. As part of its initialization functionality, code for BIOS 105 may be configured to set components of information handling system 102 into a known state, so that one or more applications (e.g., an operating system or other application programs) stored on compatible media (e.g., memory 104) may be executed by processor 103 and given control of information handling system 102.

Management controller 112 may be configured to provide management facilities for management of information handling system 102. Such management may be made by management controller 112 even if information handling system 102 is powered off or powered to a standby state. Management controller 112 may include a processor 113 communicatively coupled to processor 103, a trusted integrated processor 114 communicatively coupled to processor 113, and a co-processor 116 communicatively coupled to processor 113. In certain embodiments, management controller 112 may include or may be an integral part of a baseboard management controller (BMC) or a remote access controller (e.g., a Dell Remote Access Controller or Integrated Dell Remote Access Controller). In these and other embodiments, management controller 112 may be referred to as a service processor or access controller.

Processor 113 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 113 may interpret and/or execute program instructions and/or process data stored in computer-readable media of information handling system 102 or management controller 112. As shown in FIG. 1, processor 113 may be communicatively coupled to processor 103. Such coupling may be via a Universal Serial Bus (USB), System Management Bus (SMBus), general purpose input/output (GPIO) channel and/or one or more other communications channels.

Logic device 120 may comprise any suitable system, device, or apparatus that may perform a specialized function that extends the functionality of information handling system 102. For example, logic device 120 may serve as an interface between management controller 112 and other subsystems of information handling system 102, such interface for communication of control information associated with such subsystems. In some embodiments, logic device 120 may comprise a complex programmable logic device (CPLD) or a field-programmable gate array (FPGA).

FIG. 2 illustrates a flow chart an of example method for detection of an implant for bypassing management controller to BIOS root of trust and remediation thereof, in accordance with embodiments of the present disclosure. According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, management controller 112 and logic device 120 may act in concert to establish management controller as a root of trust for processor 103 in accordance with the '583 Application. At step 204, logic device 120 may determine if a watchdog timer of logic device 120 has timed out a threshold number of times without management controller 112 completing its boot. For example, such determination may be made if the watchdog timer of logic device 120 has timed out the threshold number of times without management controller 112 communicating a signal to logic device 120 indicating that management controller 112 is ready. If logic device 120 has determined that the watchdog timer of logic device 120 has timed out the threshold number of times without management controller 112 completing its boot, method 200 may proceed to step 206. Otherwise, method 200 may remain at step 204.

At step 206, if logic device 120 is hard-coded to prevent boot of host system 98 in the event of the failure of management controller 112 to boot, method 200 may proceed to step 208. Otherwise, if logic device 120 is hard-coded to allow boot of host system 98 in the event of the failure of management controller 112 to boot (e.g., a "no brick" policy), method 200 may proceed to step 210.

At step 208, logic device 120 may prevent boot of host system 98. In some embodiments, logic device 120 may communicate an error to a user or administrator of information handling system 102 (e.g., by causing illumination of a light-emitted diode or other indicator visible from the exterior of information handling system 102). After completion of step 208, method 200 may end.

At step 210, logic device 120 may allow boot of host system 98, which may result in some unverified code of host system 98 being executed. At step 212, logic device 120 may determine if a boot of management controller 112 has occurred (e.g., after the watchdog timer of logic device 120 timing out the threshold number of times without management controller 112 completing its boot). Such "late" completion of a boot of management controller 112 may indicate that management controller 112 was artificially held in reset, potentially by a malicious vector (e.g., malicious hardware implant). If no boot of management controller 112 has occurred, method 200 may remain at step 212. Otherwise, method 200 may proceed to step 214.

At step 214, in response to the late completion of the boot of management controller 112, logic device 120 may force host system 98 to power off (e.g., with a power button override signal or other appropriate signal). At step 216, after forcing host system 98 to power off, logic device 120 may invoke a virtual AC cycle of information handling system 102, reset management controller 112, and/or take other appropriate action. After completion of step 216, method 200 may return again to step 204.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using information handling system 102 or any other system operable to implement method 200. In certain embodiments, method 200 may be implemented partially or fully in software and/or firmware embodied in computer-readable media.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described above, the principles of the present disclosure may be implemented using any number of techniques, whether currently known or not. The present disclosure should in no way be limited to the exemplary implementations and techniques illustrated in the figures and described above.

Unless otherwise specifically noted, articles depicted in the figures are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system comprising:
   a host system comprising a host system processor;
   a management controller communicatively coupled to the host system processor and a logic device and configured to perform out-of-band management of the information handling system; and
   a logic device communicatively coupled to the host system and the management controller and configured to:
      upon determining that a watchdog timer has timed out a threshold number of times without completion of a boot of the management controller, allow boot of the host system;
      after boot of the host system, determine if a later boot of the management controller occurs; and
      if the later boot of the management controller occurs, force the host system to power off.

2. The information handling system of claim 1, wherein the logic device is further configured to, after forcing the host system to power off, invoke an alternating current cycle of the information handling system.

3. The information handling system of claim 1, wherein the logic device is further configured to, after forcing the host system to power off, reset the management controller.

4. A method, in an information handling system comprising a host system comprising a host system processor and a management controller communicatively coupled to the host system processor and a logic device and configured to perform out-of-band management of the information handling system, the method comprising:
   upon determining that a watchdog timer has timed out a threshold number of times without completion of a boot of the management controller, allowing boot of the host system;
   after boot of the host system, determining if a later boot of the management controller occurs; and
   if the later boot of the management controller occurs, forcing the host system to power off.

5. The method of claim 4, further comprising, after forcing the host system to power off, invoking an alternating current cycle of the information handling system.

6. The method of claim 4, further comprising, after forcing the host system to power off, resetting the management controller.

7. An article of manufacture comprising:
   a non-transitory computer-readable medium; and
   computer-executable instructions carried on the computer-readable medium, the instructions readable by a processing device, the instructions, when read and executed, for causing the processing device to, in an information handling system comprising a host system comprising a host system processor and a management controller communicatively coupled to the host system processor and a logic device and configured to perform out-of-band management of the information handling system:
      upon determining that a watchdog timer has timed out a threshold number of times without completion of a boot of the management controller, allow boot of the host system;

after boot of the host system, determine if a later boot of the management controller occurs; and if the later boot of the management controller occurs, force the host system to power off.

8. The article of claim 7, wherein the logic device is further configured to, after forcing the host system to power off, invoke an alternating current cycle of the information handling system.

9. The article of claim 7, wherein the logic device is further configured to, after forcing the host system to power off, reset the management controller.

* * * * *